United States Patent [19]

Ide

[11] Patent Number: 4,526,482
[45] Date of Patent: Jul. 2, 1985

[54] HYDRODYNAMIC BEARING SURFACE FOR HIGH LOADS AND LOW VISCOSITY LUBRICATING FLUIDS

[76] Inventor: Russell D. Ide, 28 Daniel Dr., Coventry, R.I. 02816

[21] Appl. No.: 577,691

[22] Filed: Feb. 7, 1984

[51] Int. Cl.³ .............................................. F16C 32/06
[52] U.S. Cl. .................................................... 384/104
[58] Field of Search ............... 384/104, 103, 105, 106, 384/97, 98, 125

[56] References Cited

U.S. PATENT DOCUMENTS

| | | | |
|---|---|---|---|
| 3,434,761 | 3/1969 | Marley | 384/103 |
| 3,704,920 | 12/1972 | Pan | 384/104 |
| 3,827,766 | 8/1974 | Watt | 384/104 |
| 4,045,098 | 8/1977 | Blondeel | 384/104 |
| 4,178,046 | 12/1979 | Silver et al. | 384/103 |

*Primary Examiner*—Lenard A. Footland
*Attorney, Agent, or Firm*—Barlow & Barlow, Ltd.

[57] ABSTRACT

A hydrodynamic bearing is disclosed which is designed to work in a fluid. The hydrodynamic bearing is formed with a central section of the load carrying surface that is more compliant so that it will deflect under load and form a pressure pocket of fluid to carry high loads.

4 Claims, 10 Drawing Figures

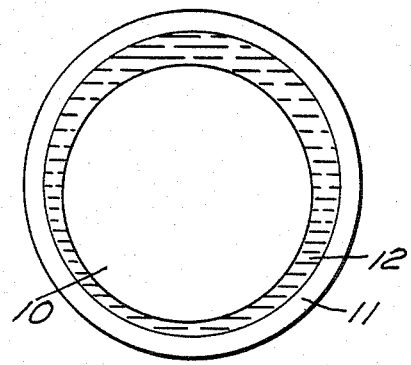
FIG. 1
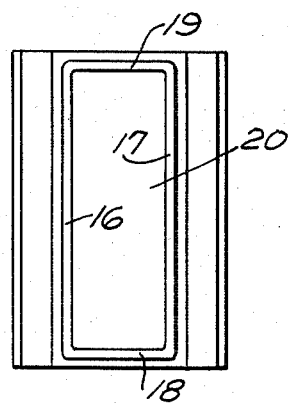
FIG. 2B
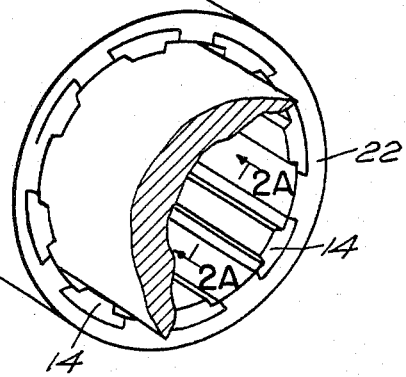
FIG. 2
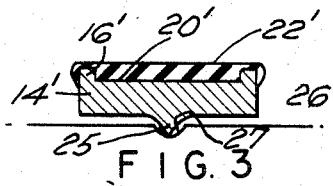
FIG. 3
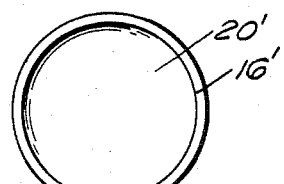
FIG. 3A
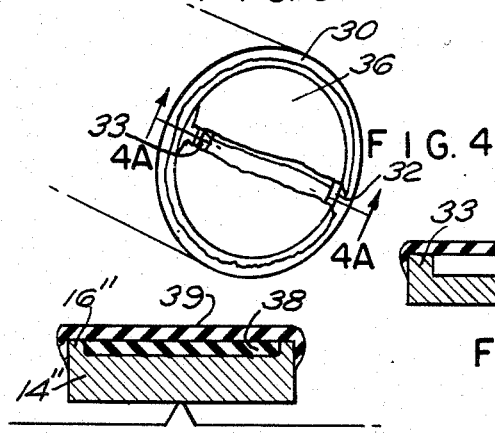
FIG. 4
FIG. 2A
FIG. 4A
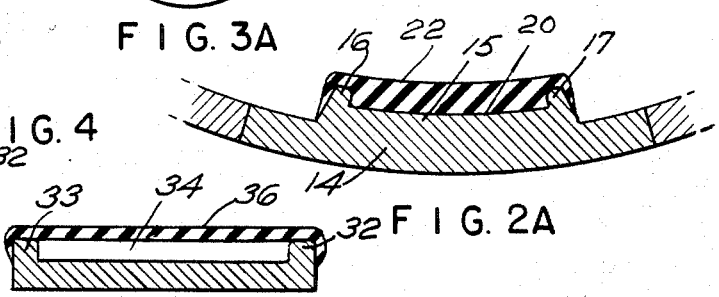
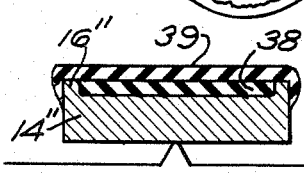
FIG. 5
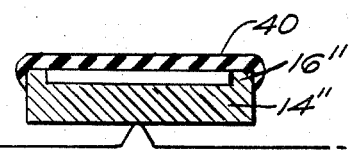
FIG. 6

HYDRODYNAMIC BEARING SURFACE FOR HIGH LOADS AND LOW VISCOSITY LUBRICATING FLUIDS

BACKGROUND OF THE INVENTION

All hydrodynamic bearings require a converging wedge shaped channel to develop lubricant pressure to separate the relatively moving parts and support load. The amount of load a hydrodynamic bearing can support is dependant on the thickness and pressure generating capability of the lubricating film formed in the converging wedge. The loss of lubricant out the sides of the wedge results in a substantial reduction in load carrying ability and overall bearing performance. This loss of lubricant is called end leakage. Additionally, the actual geometry of the channel has a significant affect on load carry capability. Sharp entrance edges on pad type bearings reduces lubricant flow into the channel and lowers performance.

SUMMARY OF THE INVENTION

The present invention is a hydrodynamic bearing in which the central section of the load carrying surface of the wedge channel deflects under lubricant film pressure to form a depression to minimize end leakage and enhance lubricant flow in the wedge to provide higher load carrying capability and improved bearing performance. The preferred embodiment of the invention relates to pad type hydrodynamic bearings in both the journal and thrust forms; but may be adapted to the continuous plain journal bearing. The present invention relates to the load carrying surface of a hydrodynamic bearing pad in which the bearing surface is a flexible material such as an elastomer or foil and whose immediate nonflexible substructure supporting the bearing surface provides a relatively compliant central section on the pad surface when compared to its edges such that under lubricant film pressure, the surface deflects to form a depression, which develops a pressure pocket on the pad surface capable of supporting exceptionally high loads. The present invention applies to all hydrodynamic bearings including moveable pad types as well as fixed geometry bearing structures.

One of the primary objectives of the present invention is to provide a hydrodynamic bearing surface with improved load carrying capability. A further object of the invention is to provide a bearing that because of its high load capability, would inherently provide improved performance in low viscosity fluids such as gases. Additionally, because the depressions are formed by deflection of the surface, entrances and exits are well-rounded to minimize entrance and exit losses. Actual depressions formed are small and of the 0.001 inch magnitude for a one inch diameter thrust pad. Specific depressions are determined by load, speed, lubricant characteristics, and pad structural geometry. Elastomer thickness must be small (less than 0.12 inches) to minimize deflection. Foil may replace the elastomer for high temperature applications. Foil stock usually does not exceed 0.040 inches to achieve sufficient deflection. Load carrying capability in low viscosity liquids such as water exceeds 1200 psi.

BRIEF DESCRIPTION OF THE DRAWINGS

FIG. 1 is a diagramatic view greatly exaggerated, illustrating the principle of this invention;

FIG. 2 is a perspective view showing a bearing made in accordance with the invention;

FIG. 2A is an enlarged cross-sectional view taken on lines 2A—2A of FIG. 2 showing an individual bearing segment;

FIG. 2B is a top view of the bearing of FIG. 2A;

FIG. 3 is a diagramatic view of the bearing design of FIG. 2 in a thrust pad form;

FIG. 3A is a top view thereof;

FIG. 4 is a perspective view of a journal bearing with parts broken away;

FIG. 4A is an enlarged view of the form of the bearing seen in FIG. 4;

FIG. 5 is another view of an alternate arrangement of a thrust bearing; and

FIG. 6 is a still further view of another thrust bearing form.

DETAILED DESCRIPTION OF THE PREFERRED EMBODIMENT

In hydrodynamic bearings fluid pressure is generated by the rotating member drawing the fluid into a film formed between itself and the stationary member. In FIG. 1 the principle is illustrated in a plain journal bearing that is greatly exaggerated, which illustrates a shaft 10 within a journal 11; a wedge being developed as at 12. Hydrodynamic bearings with compliant elastomer surfaces have been seen in the prior art, as for example in the Orndorff U.S. Pat. Nos. 3,561,830 and 3,993,371. Such compliant surface journal bearings usually have interrupted elastomer surfaces, creating in effect a set of partial bearings sharing the load. In the journal form the bearing of the invention is conveniently made from a plurality of longitudinal pieces or backing 14 which is shaped with a raised section 15 having a top surface defining a pair of spaced ridges 16 and 17 which have end ridges 18 and 19 thereon to form in effect a depression 20. An elastomer 22 is molded over this area as seen in the drawings. The elastomer, which may be a layer of rubber exhibiting a durometer of approximately 85 on the A scale, is vulcanized to the rigid backing 14. Each bearing section may be suitably fitted into the housing 22 by the use of a dovetail slot, or in any other suitable fashion. When the bearing is operated, the lubricant film pressure will deflect the elastomer in such a way as to form a depression in the surface thereof centrally of the individual pad in the area of the depression 20. Lubricant will flow into this depression and will be prevented from flowing out as the ridges will inhibit such leakage. This pressure pocket that is developed is capable of supporting exceptionally high loads—much higher than those with normal substantially flat pad-like surfaces that would engage a shaft or the like. Essentially, therefore, as the bearing is operated the fluid pressure is greater at the center of the pad than at the edges and forms the pocket, filling the same with lubricant which minimizes the area of contact.

In FIG. 3 I have shown an identical type of pad that is constructed particularly for thrust bearing applications, the pad again consisting of a rigid backing material such as metal 14', which in this case will have a continuous circular ridge 16' on the upper surface thereof to form in effect a central depression area 20'. An elastomer 22' is vulcanized to the surface, and on the back side of the pad a protrusion or pivot point 25 has been formed so that the same may pivot against a solid surface 26 which may be formed with a depression at 27 to receive the pivot 25.

Referring now to FIGS. 4 and 4A, I have disclosed a form of bearing which could be termed a continuous plane journal bearing. The housing for this bearing 30 is formed with lips 32, 33 at either end thereof so as to leave a continuous circumferential depression 34 about the interior of the housing. Vulcanized over the interior of the bearing will be a compliant flexible surface, such as an elastomer 36, or alternately a thin foil. This arrangement provides an immediate non-flexible structure at either end of the housing which intially supports a shaft and a relatively compliant central section. The arrangement is such that under lubricant film pressure, the surface deflects to form a depression which develops a pressure pocket that is capable of supporting high loads. This is an extension of the concept generally illustrated in FIG. 1.

In FIG. 5 I have illustrated a further modification of the concept of FIG. 3 in which the pad is made of rigid material 14″ and again has a continuous circular ridge 16″ that encloses a central area 38 which contains a soft elastomer. Stretched and suitably fastened to the body 14″ is a bearing surface composed of a flexible material 39 which may be a stiffer elastomer, that is one exhibit a higher number on the Shore scale, or a foil.

FIG. 6 illustrates a thrust version of the invention similar to that illustrated in FIG. 3 in which the pivot is shown diagramatically, and in which the surface now comprises a foil 40 which may have a thickness of approximately 0.04 inches, and which is laid over the upper surface of the pad and is bonded to the pad.

I claim:

1. A hydrodynamic bearing surface comprising a plurality of bearing pads, each bearing pad consisting of a rectangular member with upper and lower surfaces and having peripheral ridges extending above the upper surface of the member, a compliant bearing element affixed to the ridges whereby the element will deflect under lubricant film pressure to form a substantially central depression for formation of a pressure pocket to carry high loads.

2. A hydrodynamic bearing surface as in claim 1 where compliant bearing element is an elastomer.

3. A hydrodynamic bearing surface as in claim 1 where compliant bearing element is a thin foil.

4. A hydrodynamic bearing surface as in claim 3 wherein the central depression is filled with a soft elastomer.

* * * * *